United States Patent [19]

Kellar et al.

[11] Patent Number: 4,602,286
[45] Date of Patent: Jul. 22, 1986

[54] VIDEO PROCESSING FOR COMPOSITE IMAGES

[75] Inventors: Paul R. N. Kellar; Anthony D. Searby, both of Newbury, England

[73] Assignee: Quantel Limited, Berkshire, England

[21] Appl. No.: 457,098

[22] Filed: Jan. 10, 1983

[30] Foreign Application Priority Data

Jan. 15, 1982 [GB] United Kingdom ............... 8201136

[51] Int. Cl.[4] ............................................ H04N 5/262
[52] U.S. Cl. ...................................... 358/183; 358/22
[58] Field of Search ................................ 358/183, 22

[56] References Cited

U.S. PATENT DOCUMENTS

| | | | |
|---|---|---|---|
| 4,148,070 | 4/1979 | Taylor | 358/160 |
| 4,163,249 | 7/1979 | Michael et al. | 358/21 R |
| 4,172,264 | 10/1979 | Taylor et al. | 358/185 |
| 4,240,104 | 12/1980 | Taylor et al. | 358/22 |
| 4,286,291 | 8/1981 | Taylor et al. | 358/139 |
| 4,334,245 | 6/1982 | Michael | 358/183 |
| 4,357,624 | 11/1982 | Greenberg | 358/22 |
| 4,360,831 | 11/1982 | Kellar | 358/182 |

FOREIGN PATENT DOCUMENTS

| | | |
|---|---|---|
| 1178330 | 1/1970 | United Kingdom . |
| 1226559 | 3/1971 | United Kingdom . |
| 1404672 | 9/1975 | United Kingdom . |
| 2032217 | 7/1978 | United Kingdom . |
| 1570773 | 7/1980 | United Kingdom . |
| 2062396 | 5/1981 | United Kingdom . |
| 2089625 | 6/1982 | United Kingdom . |
| 2092346 | 8/1982 | United Kingdom . |
| 2109193 | 5/1983 | United Kingdom . |
| 2117996 | 10/1983 | United Kingdom . |

Primary Examiner—James J. Groody
Assistant Examiner—E. Anne Toth
Attorney, Agent, or Firm—Cooper, Dunham, Griffin & Moran

[57] ABSTRACT

The image composition system includes framestores 30, 31 for receiving information from first and second picture sources. A processor 33 provides the composed image by using information from these sources. The processor is controlled by picture shape information made available from a third framestore 32. This shape information may be provided by a camera 26 receiving an image of a silhouette for example or the shape can be manually generated via a touch tablet 38. The instantaneous value of the shape controls the blending of the pictures such that portions of the picture can be taken from a scene and inserted without noticeable degradation. Manipulation of the position, orientation or size of the inserted picture portion for example can also be effected.

19 Claims, 9 Drawing Figures

VIDEO PROCESSING FOR COMPOSITE IMAGES

BACKGROUND TO THE INVENTION

The invention relates to image composition arrangements. The composition of pictures where one image is keyed into a second picture is known using simple switching techniques.

Unfortunately, the results are not altogether visually satisfactory and the manipulation of such images is limited.

The present invention is concerned with providing an arrangement which allows a more realistic resultant composed image to be provided and which provides greater flexibility than heretofor.

SUMMARY OF THE INVENTION

According to the invention there is provided an image composition system comprising, first input means for providing a first source of picture information, second input means for providing a second source of picture information, means for providing a third source of picture information, processing means for receiving information from both said first and second sources so as to provide the composed picture, and control means for varying the proportions of picture information used by said processing means to provide said composed image in dependence on the information from said third picture source.

Further according to the invention there is provided a method for image composition comprising, receiving a first source of picture information, receiving a second source of picture information, receiving a third source of picture information, processing the information from both said first and second sources by variably controlling the proportions of picture information used in the processing step in dependence on information from said third picture source.

BRIEF DESCRIPTION OF THE DRAWINGS

The first and/or second information sources may comprise a picture source, color information source or synthetically generated source.

The invention will now be described by way of example with reference to the accompanying drawings, in which.

DESCRIPTION OF PREFERRED EMBODIMENTS

As already discussed, established composite image generation techniques tend to produce unrealistic results which appear contrived or degraded. This degradation can be more pronounced when the data is in digital format, due to the quantized nature of a digital television picture. To achieve enhanced results the present invention is concerned with manipulating the picture information in such a way that the composed picture is a composite picture from more than one source blended in a manner which visually results in a produced image which is generally indistinguishable from images which were composed originally as a single picture yet allowing manipulation of the composition of this picture to be effected.

Figure 1:
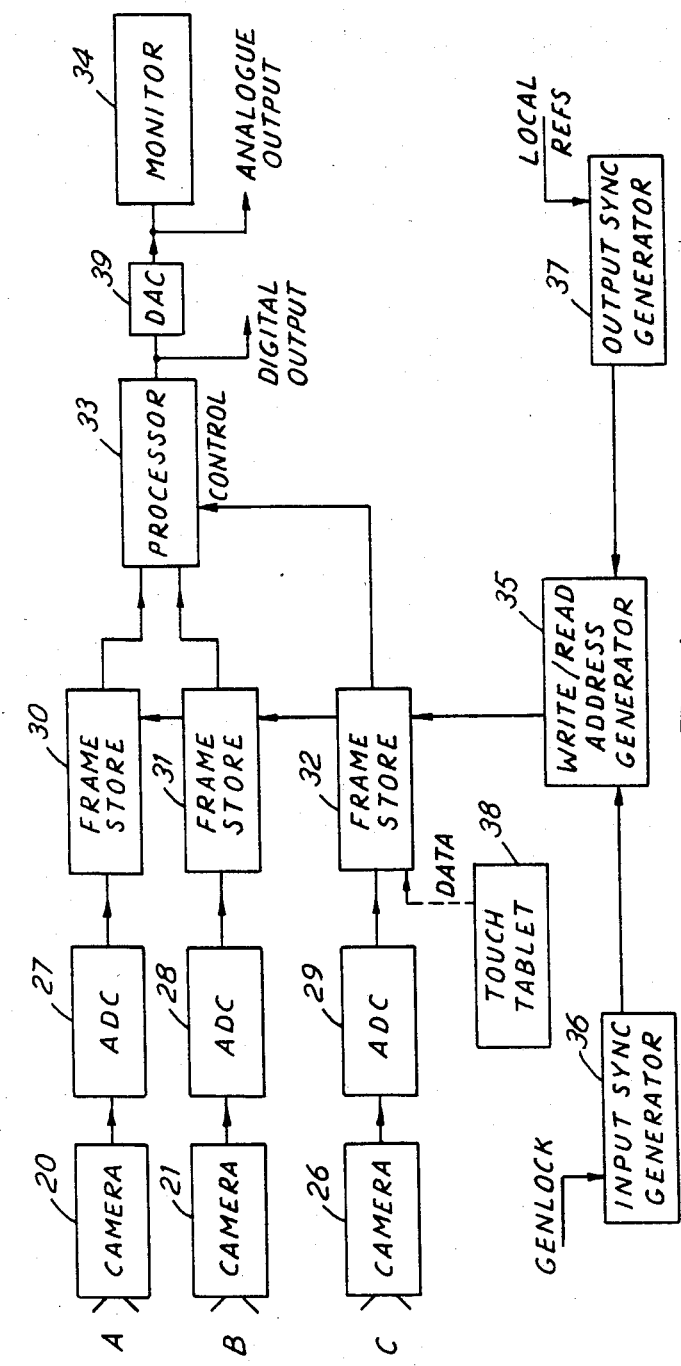
FIG. 1 shows one embodiment of the present invention for composing an image produced from more than one image source.

FIG. 1 shows one embodiment of the system of the present invention for producing the image composition. The first picture source is provided by camera 20 and passes via analogue to digital converter (ADC) 27 to frame store 30.

The second picture source is provided by camera 21 and passes via ADC 28 to framestore 31. The outputs from framestores 30 and 31 are made available to processor 33 described, in more detail below, and the result therefrom is available for display on a monitor 34, via DAC 39 as necessary, or for use elsewhere in analogue or digital form as desired. Thus the composed image from processor 33 can be considered as being comprised of picture information from both original picture sources. The way in which these sources are used within the processor is effectively controlled by a third source of picture information. This is shown as being provided by the additional framestore 32.

This further framestore 32 contains picture shape and blending information for use in controlling the processor 33. This information may have been derived via camera 26 and ADC 29 or touch tablet 38 as explained below and can be considered as a variable stencil for use in composing the picture.

Figure 2:
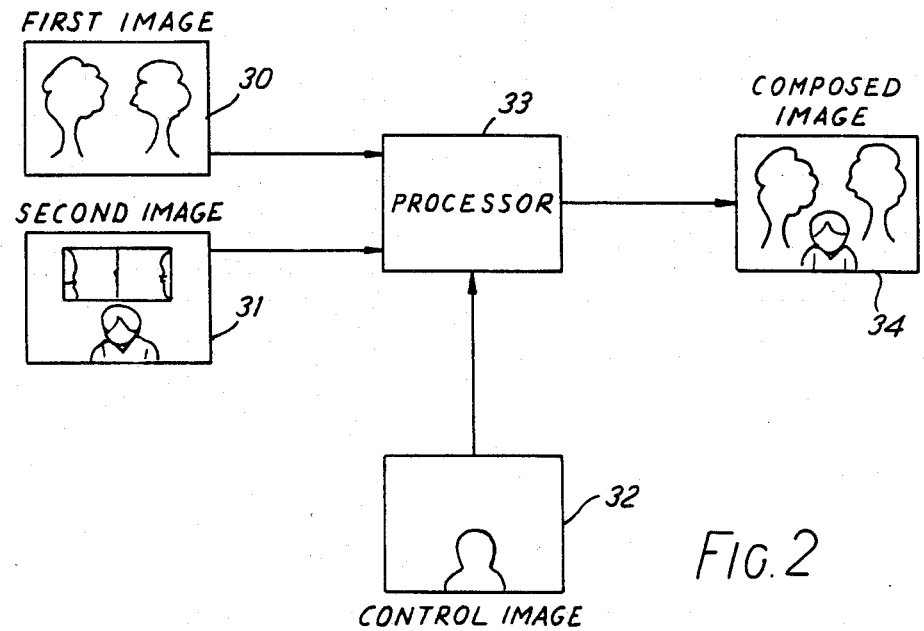
FIG. 2 shows visual representation of the image composition.

The resultant manipulation is exemplified in FIG. 2. The first and second images within framestores 30 and 31 respectively are received by processor 33. The control image from framestore 32 is used to cause the processor to compose the final image from the first image together with that portion of the second image corresponding to the shape of the control image. This allows only selected features from within the second image to be used in the final image. Thus the person can be transported from the original indoor scene shown into an outdoor scene as shown on monitor 34. In practice the processor is also configured to manipulate the data in such a way that the insert is realistically blended into the picture to appear as if it were there in the original scene. The control image itself is the mechanism which directs this blending operation, using both its shape and instantaneous value as now explained.

Figure 3:
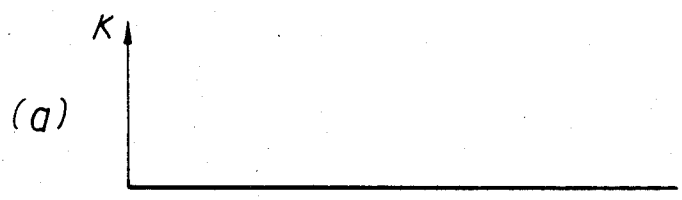
FIG. 3 shows various parameter values illustrating the blending technique employed in the image compsition.
Figure 3:
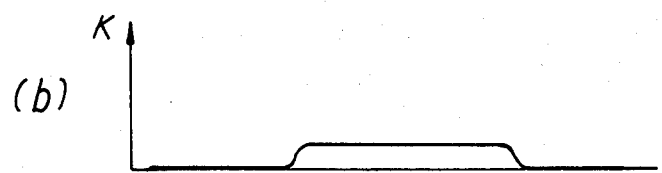
Figure 3:
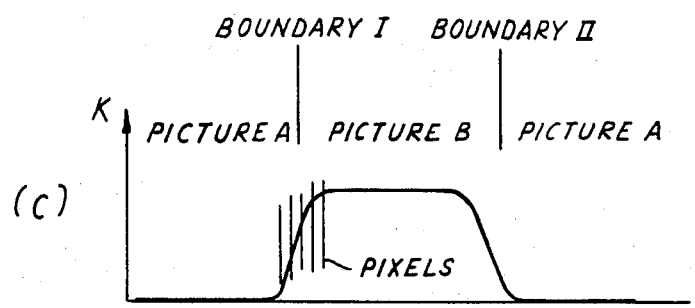
Figure 3:
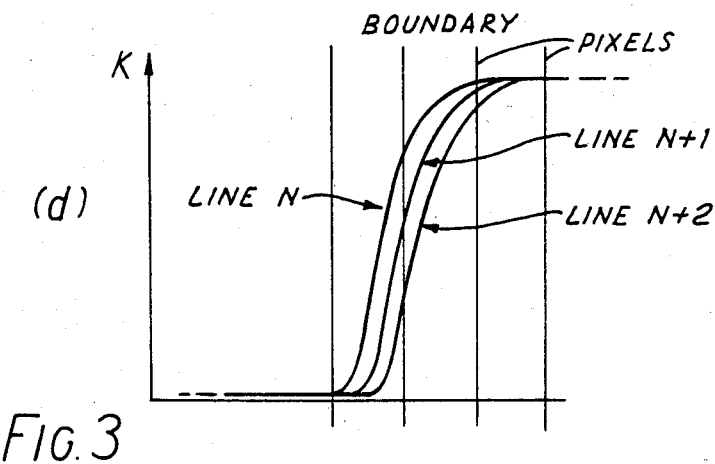

The control image is arranged to effectively define the percentage used from one picture when processed with the other picture, with blending for example adjacent the picture insert interface. This value (K) is shown in the example of FIG. 3c as varying initially from a minimum to a maximum adjacent boundary I and then subsequently decreasing to a minimum adjacent boundary II for that T.V. line. In the FIG. 2 example, this could correspond to a T.V. line towards the bottom of the frame. At the changeover, this technique avoids any sharp edges by providing a gradual increase in picture contribution spaced over one or more picture points. Thus, adjacent the first boundary, a small contribution is made from the picture about to be inserted (picture B) and this increases, with a corresponding decrease in picture A until B completely replaces first picture source A. When the next boundary is approached, the operation repeats, this time in reverse. This technique results in blending of the pictures from the first and second sources in this example only in the marginal regions of their interface. Although the blending described can be considered as along a horizontal line, the same technique is employed vertically. At other parts of the picture the relationship will be different. Since the transition point may be displaced on subsequent scan lines, each line will result in slightly different values of K as exemplified in FIG. 3d. For any parts of the picture where no contribution is required from the second picture source B, then K will be a minimum throughout the horizontal scanning line (see FIG. 3a). Where the insert has a horizontal edge, then adjacent this boundary, a value of K shown in FIG. 3b could be expected for the relevant scanning line. Adjacent lines would have an increasing value of K until the FIG. 3c situation was reached, thus giving the blending technique vertically as well as horizontally.

The frame stores 30 to 32 share common write/read addressing block 35, which is under the control of the input sync generator 36 and output sync generator 37 in normal manner.

The process within processor 33 required to achieve the blending is given by the equation:

$$\text{OUTPUT} = K \times \text{PICTURE 1} + (1-K) \times \text{PICTURE 2}$$

where $K < 1$.

Figure 4:
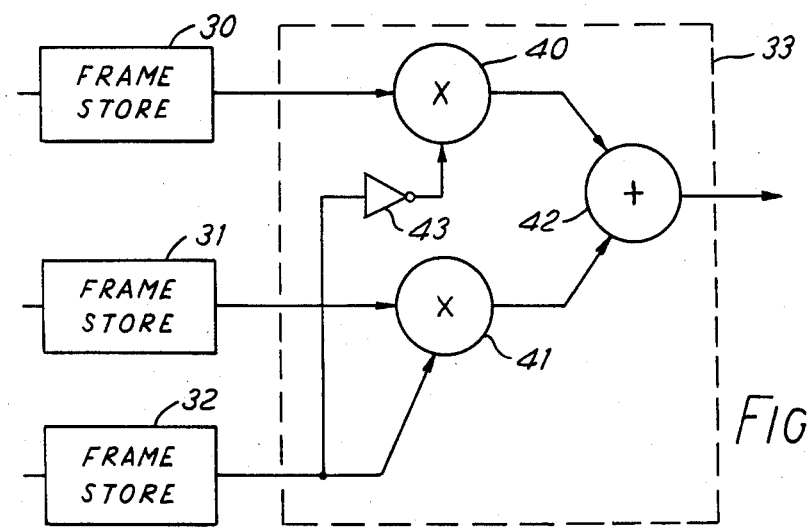
FIG. 4 shows an embodiment of the processor of FIG. 1.

An embodiment for the processor 33 is shown in FIG. 4. The value of K from control shape store 32 for a given pixel location is received by multiplier 41 and its inverse $(1-K)$ is made available to multiplier 40 via inverter 43 to control the image composition. The outputs from multipliers 40, 41 are received by adder 42, the output of which can be passed to the monitor as described in FIG. 1.

Although the system is shown for simplicity as having single frame stores 30 and 31 for handling monochrome only it can be extended to color by adding additional memory to these picture framestores and also adding parallel processing circuitry for the color data.

Although the picture shape with associated values of K for each picture point within the frame for store 32 could be generated synthetically, a preferable way of providing these values is to use a visual shape mechanism. One approach shown in FIG. 1 is to use a camera 26 with its output passed to store 32 via ADC 29. The insert shape can be a profile or silhouette which will in practice cause a slope to be produced in the analogue output level from the camera over a number of picture points as in FIG. 3c and thus when digitized and stored as 8 bit words for example will give the variation in K desired for smooth blending in the changeover region.

By providing shapes with intermediate intensity values for K throughout the insert, we have found that special effects such as transparent or translucent images for example can be included in the composed scene.

By incorporating a high resolution camera or by including filtering techniques, the number of pixels involved at changeover (horizontally and vertically) and thus the gradient of the slope can be varied. Another approach shown in FIG. 1 is to use a touch tablet 38 or other manually operable device to provide the desired insert shape and use this as the k data input to the store 32 using techniques extending from these described in UK Patent Publication No. 2089625 for example, as described with reference to FIG. 9 below.

Although the picture inputs to the stores 30 and 31 have been described as coming from cameras, the system is flexible enough to allow other picture sources to be used. One specific aspect is to compose a picture containing graphic information. In this case store 30 can provide the background information (luminance or color) and the graphic shape can be input to store 32 as before. These shapes could be derived from any suitable source but for realism the manner described in FIG. 9 below is preferable. The shape could be a straight line, circle, alpha/numeric or other character if desired. In the present situation the store 31 could merely contain a fixed (or variable) color or intensity which would be selected dependent on shape defined by store 32.

Now wherever the store 32 gives a value of zero then the output from framestore 30 will be passed to the monitor 34 without modification, but when the store 32 output equals one then the color as defined by the store 31 will appear on the monitor. For values between nought and one a proportion of mix of color value and framestore 30 output will be applied to the monitor.

Where the system is used in conjunction with the image creation system mentioned above the picture visible on the monitor directly simulates the effect which the artist will achieve on his picture when he finally decides to commit these lines and other graphic representations to his picture, or alternatively can use these lines as a guide line as the picture is created.

Although the FIG. 1 arrangement is shown with common addressing for framestores 30-32, so that there is a fixed pixel relationship between the images stores therein, an additional benefit can be achieved as now described with reference to FIG. 5 to allow a changeable pixel relationship with additional manipulation so that, whilst retaining the original picture information, is is possible to move the location, size or orientation of the insert into the composed picture.

Figure 5:
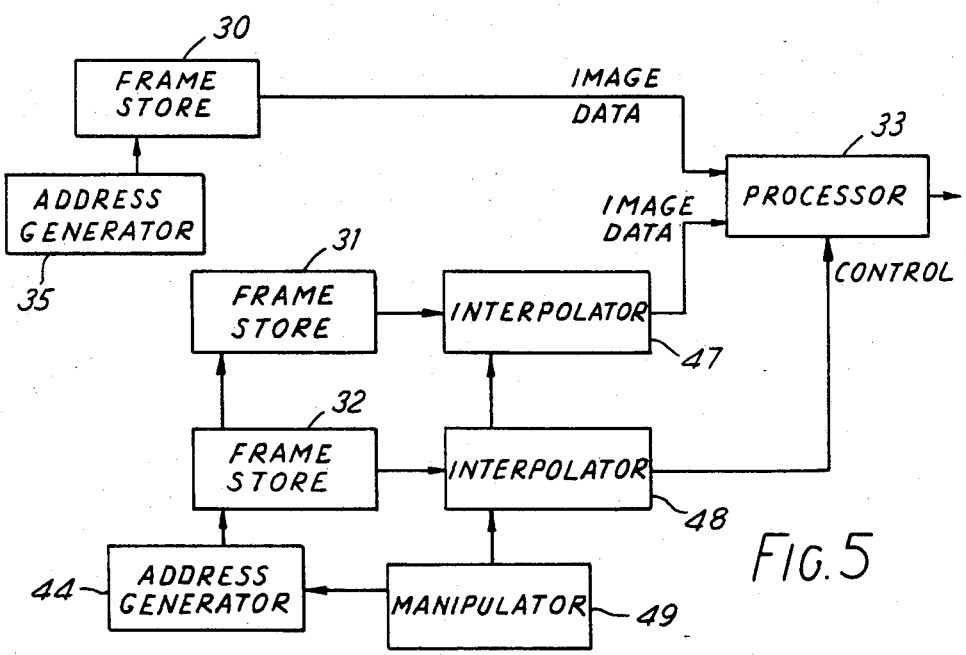
FIG. 5 shows additional manipulation components.

The FIG. 5 arrangement is concerned with the manipulation of information from the framestores and, for simplicity, only the relevant blocks are included. The input and output arrangements would be as in FIG. 1. The address generator 35 is now used only with the first picture framestore 30. An additional address generator 44 is provided for use by both the second picture framestore 31 and the control shape image framestore 32. The outputs from framestores 31 and 32 now pass via interpolators 47 and 48 prior to receipt by processor 33. The read addressing of the framestores and the control of the interpolators are effected by manipulator 49 to give the required address selection and pixel interpolation to achieve the size change or orientation desired for example. The mechanisms for interpolation and address manipulation are known in the art see also U.S. Pat. No. 4,163,249 for example. Because the addressing block 44 is common to framestores 31 and 32 the pixel relationship is maintained. This ensures that the manipulation of the control image shape is duplicated for the image within framestore 31. Thus, considering the images represented in FIG. 2, the control image can be manipulated so that it can be shrunk for example and the person in the second image will shrink also and be inserted in the picture at reduced size. Rotation manipulation of the control shape will cause the person to lie down in the final image for example.

The requirement to produce a new shape representation each time is removed. Manual control of the position, size or orientation can be achieved using trackerball or joystock for example in usual manner.

Where there is a requirement to only move the control image location an alternative system can be used without employing interpolation as now described.

An example of the use of this technique is for 'cut and paste'. An artist often finds that he is painting the same pictures over again and it would greatly assist him if he could have a means of taking part of the previously drawn picture and pasting this into his new picture.

Figure 6:
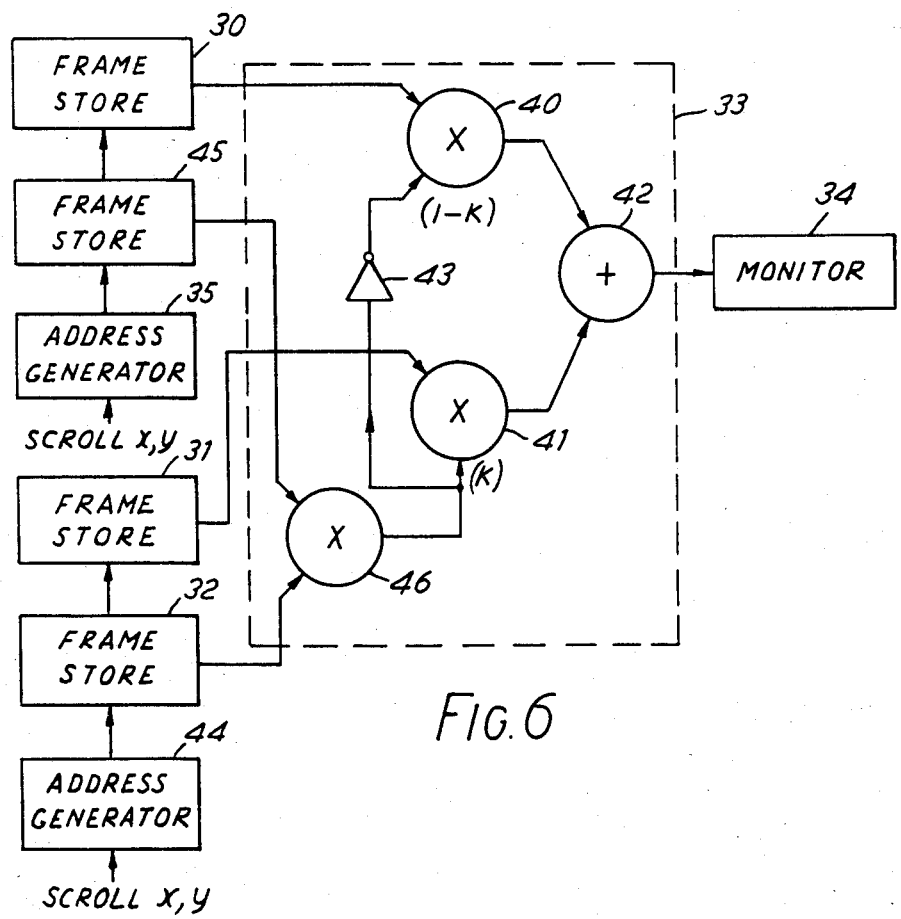
FIG. 6 shows an arrangement allowing the capability of moving the inserted picture.

Prior to pasting together his pictures the artist may require that the picture to be pasted can be moved around the original screen and viewed as if it existed in that picture but without finally committing it to the picture, this can be achieved using a system as shown in FIG. 6. The picture framestores 30, 31 now each has its own address generator 35, 44 which can be independently controlled. If the start address of generator 44 is varied, while the start address of address generator 35 is kept at 0.0, then using the shape as defined in store 32, the picture cut from picture B can be made to move around the picture A until its desired placement is found. This movement can be controlled by joystick, tracker ball or other means.

In addition a further shape store 45 is provided as a refinement to allow a foreground object to be defined in picture A. This store 45 is also driven by address generator 35. This store contains the shape or blending information which defines the foreground object in picture A. The processor 33 has been modified to include a further multiplier 46 to cope with the additional manipulation. To produce the correct K factor for the processor the outputs from stores 45 and 32 are first multiplied together before being applied to the processor as previously described. The result as far as the artist or operator is concerned will be that as he moves his cut picture from picture B around picture A then it will seem to disappear behind the objects in picture A which are defined as being foreground.

The system is shown with the capability of scrolling both or either picture A or B using addressing blocks 35 or 44.

The common address generator 35 for stores 30 and 45 and the common address generator 44 for stores 31 and 32 ensures that correct picture relationships are maintained.

The ability to move and insert parts of the picture make the system ideal for providing animation. An image of an animal or parts thereof can be inserted and moved across the screen and if a separate cut out shape of the legs are stored then these can be manipulated and captured frame by frame under joystick control for example to simulate a walking movement whilst the animal tranverses the picture.

Alternatively, the positions can be generated under computer control, where a range of repetitive movements can be made available and so create simply and less tediously animation effects.

Figure 7:
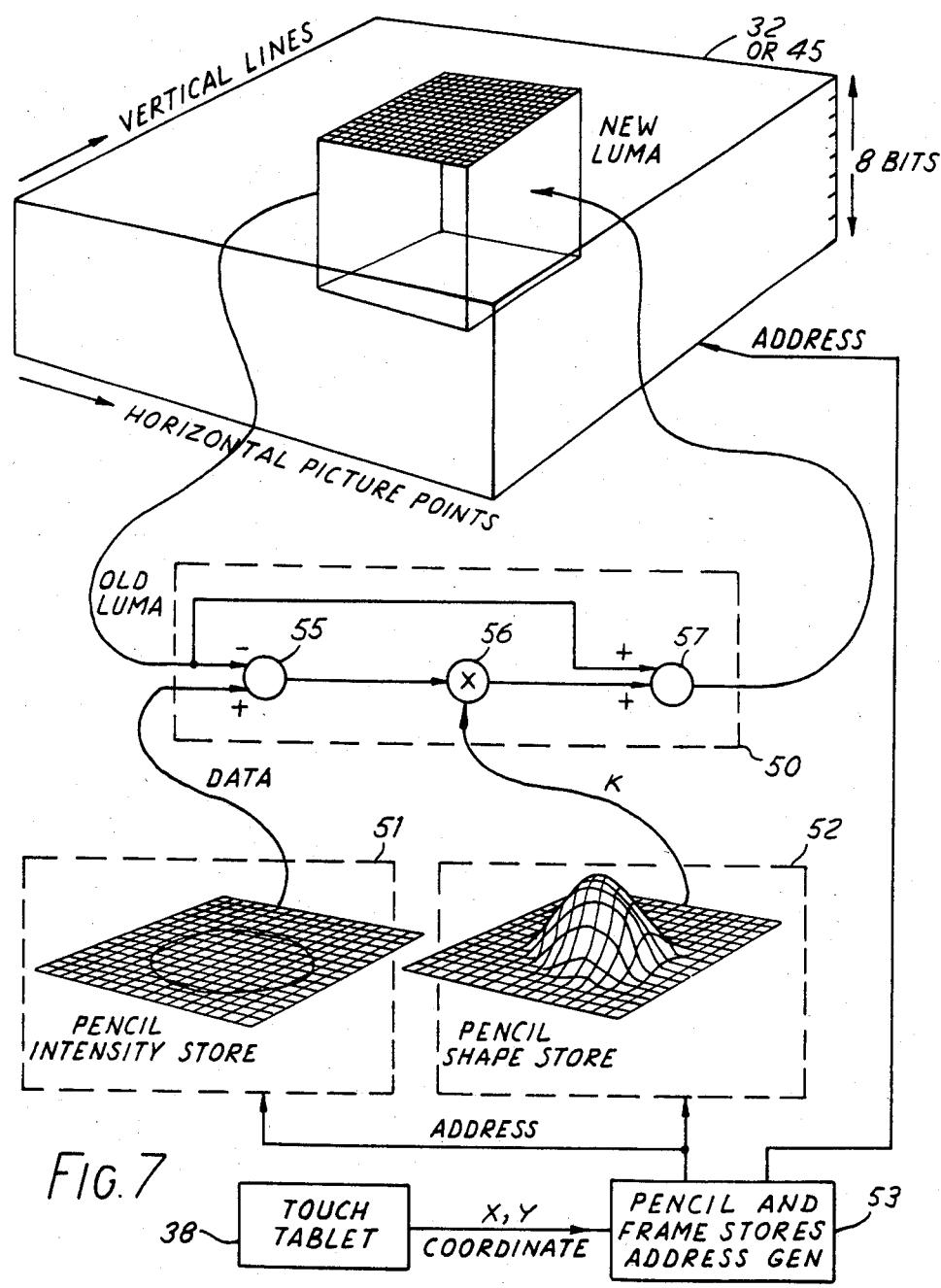
FIG. 7 shows an arrangement for artificially generating the insert shape.

As already mentioned a touch tablet 38 or its equivalent can be used to enter the desired shape information into stores 32 or 45. In order to produce the blending effect desired, our research has shown that this can be provided by utilizing techniques derived from modified arrangements to those disclosed in UK Patent Publication No. 2089625. Thus the touch tablet 38 of FIG. 1 is in practice used with additional system elements to provide the desired painting or drawing techniques as now described in detail in FIG. 7.

The co-ordinates from the touch tablet 38 are received by an address generator 53 which provides addressing for the frame store 32 so as to correctly enter the data into the store locations. The frame store could alternatively be store 45 of FIG. 6. The address generator controls the frame store to allow a 'read-modify-write' sequence to occue, the modification taking place in processor 50. The address generator 53 also controls the stores 51 and 52 which have a size corresponding to a designated number of picture points in a patch. The pencil intensity (or color) and pencil shape provided by stores 51 and 52 are an ideal way of providing the insert shape as the artist or operator can draw around the object of interest and then fill in the space inside the outline. Because of the pencil shape being of the type that falls away at the edges, this will also cause the desired blending effect as now described.

A patch of $16 \times 16$ pixels is shown as being large enough to encompass the desired pen shape in this example. The peak of the pen shape is central of the patch in this instance and will produce the maximum value of K at this point. The x and y coordinate provided by the touch tablet will correspond to the corner of the patch read out from the store and processing of all points within this patch is effected in processor 50 and the modified data written back into the store 32 (or 45). During this processing the old luminance value and the designated intensity value are subtracted in subtractor 55 and the difference multiplied by coefficient K in multiplier 56, the value of K being dependent on where the particular picture point lies within the selected patch. The result is added to the earlier luminance data by adder 57. It is clear that some picture points at the periphery will remain unchanged in this example. Movement of the actual stylus on the touch pad by one picture point will cause a new patch to be read out from the store 32 which will contain most of the earlier picture points but 16 new pictures will be present and naturally 16 others will have been omitted. The processing will again be carried out for the entire patch. It can be seen that during the second processing operation just described, the previous movement by 1 picture point will cause a proportion of the luminance information generated by the earlier processing operation to be used in the calculation of the new content for the updated patch.

The number of processing steps for a given coordinate will depend on the size of the patch accessed.

Thus, if the patch was say 32 picture points wide and 32 high there are $32 \times 32$ or 1024 points to be processed for each movement of the stylus.

In this way, the insert shape is built up. At the edges the intensity will automatically fade away, allowing the blending effect to be achieved as the desired value of K will have been provided and entered into stores 32 or 45 during this operation. Shapes drawn with variable intensity other than at the boundary will cause variable blending elsewhere. The operator can view this shape during or after generation by feeding the data from the relevant store to the monitor 34, or by considering it as a graphic input and superimposing it on the original picture as described above.

Figure 8:
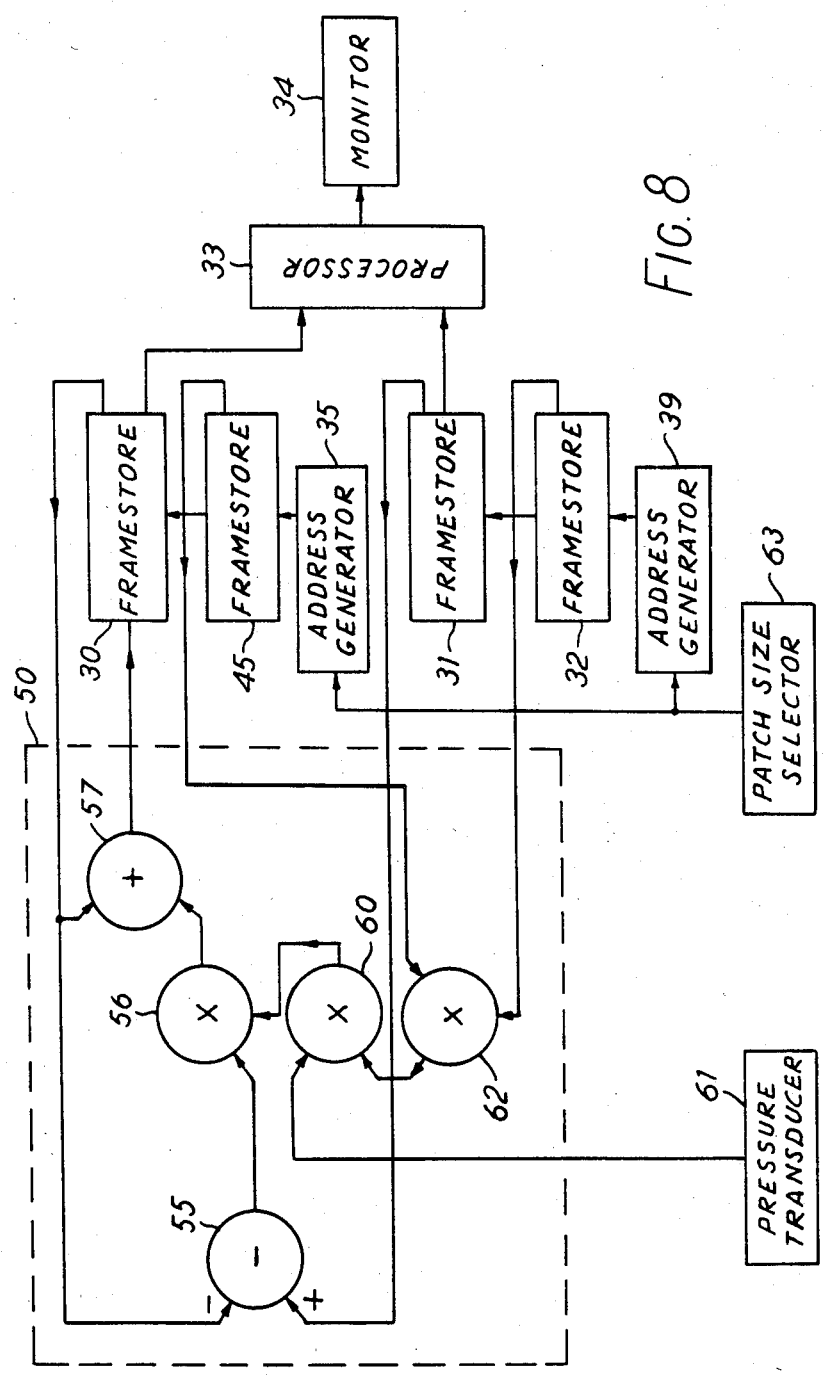
FIG. 8 shows an arrangement allowing the insert to be transferred to the original picture.

Once the operator or artist has decided where he requires his cut picture to be placed then there is a need for actually transferring the cut picture from picture B to picture A. Once again, the cut picture must be blended in properly when interfaced to the original picture and this can be achieved using the arrangement shown in FIG. 8. In this case, however, instead of the pencil color and pencil shape together with framestore 32 output being applied to the processor 50 as in FIG. 7, the framestore 31 plus its insert shape as defined by store 32 are applied to the processor in place of the pencil or the implement.

As for the video path this processing path also requires that framestore 30 and framestore 31 have separate address generators 35, 39 as they have to be accessed from different addresses for a particular process. To achieve the foreground/background effect then the outputs from the stores 32 and 45 are multiplied in an additional multiplier 62 before being received by the other elements of the processor. A further multiplier 60 is provided which acts as an input for pressure provided from transducer 61 thus allowing the information from framestore 31 to be only partially applied onto the framestore 30 information if so desired.

A dedicated processor is required for block 50 in order to achieve reasonable processing speed. A full framestore of 584×768 pixels takes about 0.6 of a second to be pasted into the first framestore 30. Since in many cases the object to be cut from framestore 31 does not occupy the whole of this framestore then a saving in time can be made by only accessing a rectangle which is sufficient to enclose the object to be cut. This patch size can be controlled by a patch size selector 63 as shown which in turn controls the implementing of the two address generators. In practice this patch size generator could incorporate a similar addressing mechanism to that used for the address generation within block 53 of FIG. 7 and described in more detail in the aforementioned patent application.

The output provided by this processing is given by the following:

$$\text{OUTPUT} = (1 - K_1)FS_1 + K_1[K_2FS_2 + (1 - K_2)FS_1]$$
$$= [(1 - K_1) + (K_1 - K_1K_2)]FS_1 + K_1K_2FS_2$$
$$= (1 - K_1K_2)FS_1 + K_1K_2FS_2$$

where $K_1$ is the output provided by store 45
$K_2$ is the output provided by store 32
$FS_1$ is the output provided by store 30
$FS_2$ is the output provided by store 31.

Although the control image shape and intensity has been described as being generated in a single operation, in practice the shape can be first defined and the intensity or color built up subsequently. This allows special effects mentioned above to be readily altered by the operator.

Figure 9:
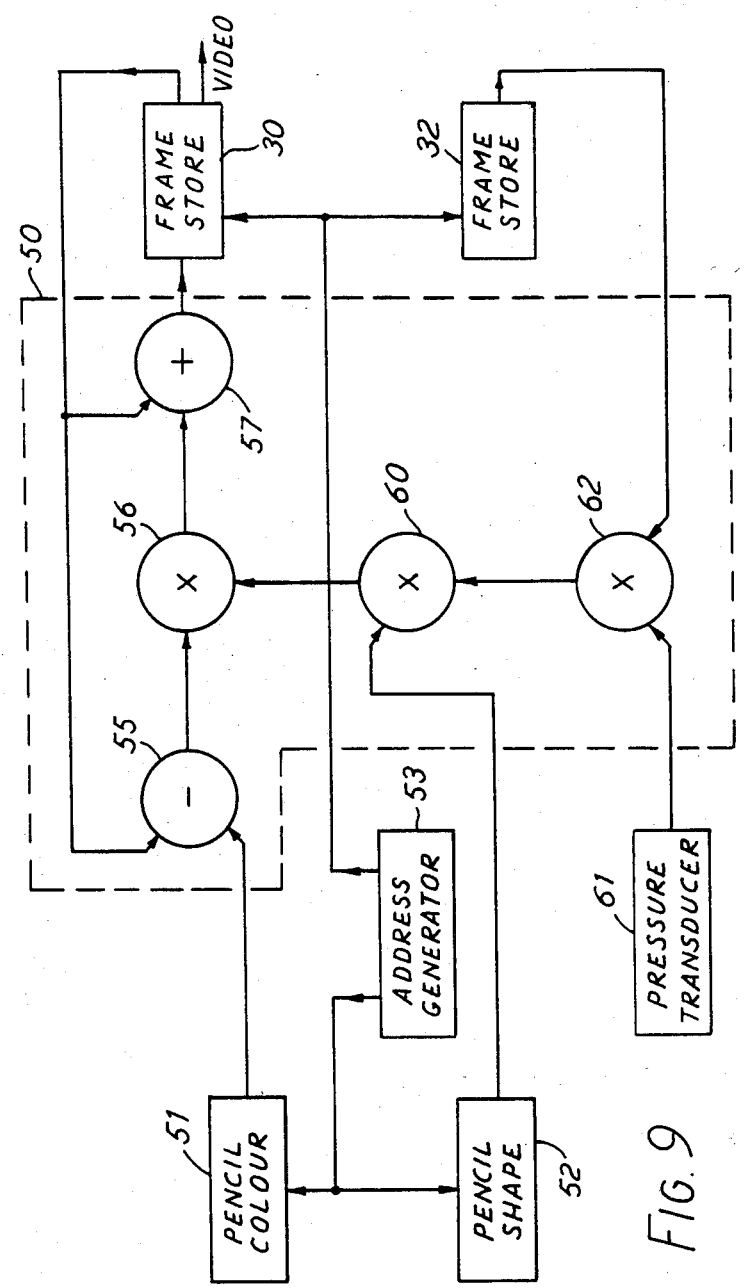
FIG. 9 shows an arrangement for providing a mask to aid picture build up.

From the artistic point of view this is similar to applying a form of masking tape or stencil to the picture so defining the area within which the artist requires his paint applied to the paper. This is of particular use when using an airbrush but may also be used for any other painting media. This arrangement now described provides a means of producing the equivalent of painting mask electronically as shown in FIG. 9. The processor is similar to that of FIGS. 7 and 8 and the system includes the store 32 which is driven in parallel with the framestore 30. When the pencil color (or intensity), pencil shape and framestore value are read out an additional value is read out from the store 32 which defines the mask. This is multiplied in multiplier 62 by the pressure from the stylus via transducer 61 before the further processor steps. Thus the store 32 modulates the pressure such that when the mask is one the pressure is allowed through and there is no effect upon the painting but when the mask is zero then the pressure is turned to zero and no painting will appear on the framestore. Since the mask can have any value between nought and one a shape can be applied to it which will define the exact shape in which the artist requires his paint to be applied.

Once again, the mask provides a blend of the required paint to the original picture and so producing a very natural effect.

Thus the various embodiments described allow a composite picture to be generated from normal picture sources or by synthesis, which retains its realism by removing sharp edges from the interfaces and allowing additional manipulation such as relative movement to be provided, under the control of the image shape.

We claim:

1. An image composition system comprising:
   a first input for first digital image signals representing an image;
   first frame store means for storing a frame of said first digital image signals;
   a second input for second digital image signals representing an image;
   second frame store means for storing a frame of said second digital image signals,
   a third input for first digital control image signals representing a control image;
   a third frame store means for storing a frame of said first digital control image signals;
   a fourth input for digital image signals representing a second control image;
   fourth frame store for storing a frame of said second control image signals; and
   combining means for producing a composed image by selecting for said composed image only signals from said first frame store means when said first control image signals have a particular value and for selecting for said composed image signals from one or the other or both of said first and second frame store means, depending on the value of said second control image signals, when said first control image signals have a different value, and for combining any image signals selected from both of said first and second frame store means in order to produce said composed signal.

2. An image composition system according to claim 1, wherein said first frame store means and said third frame store means have separately controllable address generators to enable the image in one store to be modified spatially relative to that in the other.

3. An image composition system as in claim 2 comprising operator controlled graphic means arranged to provide the digital control image signals representing a control image to a selected one of said third and fourth inputs.

4. An image composition system as in claim 3 wherein said graphic means include a manually operable coordinate selecting means and a processor for synthesizing the control image in dependence upon coordinates made available by said selecting means.

5. An image composition system as in claim 1 comprising operator controlled graphic means arranged to provide the digital control image signals representing a control image to a selected one of said third and fourth inputs.

6. An image composition system comprising:
first input means for providing a first source of picture information representing a first image;
second input means for providing a second source of picture information representing a second image;
means for providing a third source of picture information representing a control image;
manipulating means for selectively manipulating the picture information of said second and third sources to provide a common change in the spatial relationship of the respective image and control image from the second and third sources relative to the first image;
processing means for receiving information from said first source, and from said second source after manipulation, if any, by said manipulating means, and for providing therefrom a composed image; and
said processing means including control means responsive to said control image for varying the proportions of picture information from said first and second sources used by said processing means to provide said composed image, in dependence on the information from said third source.

7. An image composition system comprising:
a first input for digital image signals representing an image;
first frame store for storing a frame of said digital image signals;
a second input for digital control image signals representing a control image;
second frame store for storing a frame of said digital control image signals;
manipulating means for manipulating signals of said first and second frame stores to achieve a spatial transformation of the image and the control image, wherein said image and said control image undergo the same spatial transformation;
a source of other digital signals representing an image;
combining means for combining digital signals from said first frame store means, after manipulation thereof, if any, by said manipulating means, with said other digital signals representing an image to produce a composed image, said combining means including control means for varying the proportion of the digital signals from said first store and said other digital signals used in the composed image, in dependence on said control image after manipulation thereof by the manipulating means.

8. An image composition system as in claim 7, wherein said second frame store stores digital signals which have one value when the composed image is to consist of signals from said first frame store, a different value when the composed image is to consist of said other digital signals, and one or more intermediate values when the composed image is to consist of a proportion of the signals from said first frame store and of said other digital signals.

9. A system as in claim 8, wherein said manipulating means include an interpolator for manipulating information from two or more pixels of an image from the first store to produce a pixel of the manipulated image, to thereby ensure that picture quality is maintained.

10. An image composition system as in claim 7 including means for designating part of the said digital image signals or said other digital image signals as a priority area and to cause the designated part to be output in the composed image in preference to other image signals for the same area of the composed image.

11. An image composition system as claimed in claim 10, including a further frame store for storing digital signals representing a control signal indicative of the shape of said priority area.

12. A method of image composition comprising the steps of:
storing first digital signals representing an image;
storing second digital signals representing an image;
storing digital signals representing an input control signal;
manipulating the first or second digital signals to provide spatial transformation thereof, and manipulating the control signal to provide thereby an output control signal which has undergone the same spatial transformation as one of the first or second digital signals;
and combining first and second digital signals in dependence on said control signal.

13. An image composition system comprising:
a first frame store which stores digital signals representing a control image;
graphic means including manually operable coordinate selecting means for selectively providing and storing digital control image signals in said first frame store which represent a control image and define at least a selected area of an image frame, wherein said selected area has a boundary, said graphic means causing the signals in the first frame store to change gradually in value at the boundary of the selected area over a distance of a plurality of image points;
a second frame store; and
control means applying digital signals representing at least a part of a desired video image to said second frame store in proportion determined by the magnitude of respective digital signals stored in said first frame store, said proportion changing gradually in the vicinity of and toward the boundary of said selected area.

14. An image composition system as in claim 13 wherein said graphic means generate digital signals representing at least a part of a frame of said control image.

15. An image composition system as in claim 13 wherein said control means include operator-controlled pressure sensitive means which vary the effect of the digital signals representing said control image on the digital signals applied to said second frame store, as a function of operator-applied pressure.

16. An image composition system as in claim 13 wherein said graphic means comprise means for generating, so as to form part of said image, digital image signals representing a desired color.

17. An image composition system as in claim 13 in which said graphic means include means responsive to a selection by said manually operable coordinate selecting means for providing digital signals for a patch of image points positionally located by said selection, the digital signals for said patch changing gradually in value from an interior region toward the edge of the patch and the digital signals which are provided for storage in said first frame store being responsive thereto, said digital signals which are provided for storage in the first frame store varying at the boundary of the respective area over the distance of a plurality of image points.

18. An image composition system as in claim 17 in which said graphic means include means for providing digital signals representing intensity values for said patch of image points, shape means for providing further signals representing a desired profile for said patch, means for combining said intensity value signals respectively with any digital signals stored in said first frame store for corresponding image points, the proportions in which said signals are combined being a function of said profile signals.

19. An image composition system according to claim 18 wherein said shape means are capable of selectively providing further signals representing different profiles simulating different drafting implements.

* * * * *